(12) United States Patent
Youngner et al.

(10) Patent No.: US 7,000,477 B2
(45) Date of Patent: Feb. 21, 2006

(54) OPTICAL PRESSURE SENSOR

(75) Inventors: Daniel W. Youngner, Maple Grove, MN (US); Son Thai Lu, Plymouth, MN (US)

(73) Assignee: Honeywell International inc., Morristown, NJ (US)

(*) Notice: Subject to any disclaimer, the term of this patent is extended or adjusted under 35 U.S.C. 154(b) by 0 days.

(21) Appl. No.: 10/884,292

(22) Filed: Jul. 2, 2004

(65) Prior Publication Data

US 2004/0244502 A1    Dec. 9, 2004

Related U.S. Application Data

(62) Division of application No. 10/036,629, filed on Dec. 21, 2001, now Pat. No. 6,894,787.

(51) Int. Cl.
*G01B 9/02*    (2006.01)
*G01L 11/00*    (2006.01)

(52) U.S. Cl. ...................................... 73/702; 73/862.59

(58) Field of Classification Search ................ 356/480, 356/519; 73/702, 704, 705, 862.59, 862.41, 73/715
See application file for complete search history.

(56) References Cited

U.S. PATENT DOCUMENTS

| | | | |
|---|---|---|---|
| 4,163,953 A * | 8/1979 | Springthorpe et al. | ........ 372/45 |
| 6,546,804 B1 * | 4/2003 | Stemme et al. | ............... 73/704 |

* cited by examiner

*Primary Examiner*—Hwa (Andrew) Lee
(74) *Attorney, Agent, or Firm*—Kris T. Fredrick

(57) ABSTRACT

A pressure sensor is formed on a substrate, the surface of the substrate having a p-n junction and a shell with a beam inside the shell over the p-n junction. The beam and the shell and the p-n junction surface form optical Fabry-Pérot cavities. An optical fiber is positioned in a hole formed in the underside of the substrate below the p-n junction. Light from the fiber charges the p-n junction and drives it into vibration mode. Pressure changes change the tension in the diaphram to vary the frequency with changes in pressure, so that pressure can be detected.

18 Claims, 3 Drawing Sheets

OPTICAL PRESSURE SENSOR

CROSS-REFERENCE TO RELATED APPLICATION

This is a Divisional Application of U.S. patent application Ser. No. 10/036,629, filed Dec. 21, 2001, now U.S. Pat. No. 6,894,787.

BACKGROUND OF THE INVENTION

1. Field of the Invention

The present invention relates generally to a pressure sensor, and in particular to a resonant microbeam pressure sensor having a polysilicon microbeam resonator attached to a portion of the sensor diaphragm and a resonator beam and having an optical fiber directing a light beam to the resonator beam to read the resonance mode optically.

2. Description of the Related Art

A pressure sensor is disclosed in U.S. Pat. No. 5,808,210 in which a micromechnical sensor has a polysilicon beam that is an integral part of the diaphragm. The resonant frequency of the beam is a direct result of the pressure applied to the external surface of the diaphragm. Fabrication of this resonant microbeam sensor requires no backside wafer processing, and involves a process and layout independent of wafer thickness for high yield and robustness. Both the diaphragm and the resonant beam are formed from polysilicon. The sensor may have more than one resonant beam. The sensor beam or beams may be driven and sensed by electrical or optical mechanisms. For stress isolation, the sensor may be situated on a cantilevered single crystal silicon paddle. The sensor may be recessed on the isolating die for non-interfering interfacing with optical or electrical devices. The sensor die may be circular for ease in mounting with fiber optic components. The contents of the U.S. Pat. No. 5,808,210 are incorporated herein by reference.

FIG. 2 of the present application sets forth an example of an earlier embodiment of a resonant beam pressure sensor. The FIG. 2 shows a thin film resonant microbeam absolute pressure sensor 10 in which a beam 12 is held by posts 13 inside a shell 14. The shell 14 is provided on a substrate wafer 16 with a vacuum, or at least a partial vacuum, inside the shell 14. The substrate 16 has a photodiode, or p-n junction, 18 formed on a top surface thereof within the shell 14. A Fabry-Pérot resonant cavity is formed within the shell 14, including a first portion between the beam 12 and the inside of the top of the shell 14 and a second portion of the cavity between the resonant beam 12 and the top of the substrate 16. An optical fiber 20 which is positioned above the shell 14 at the front side of the sensor directs light onto the beam 12 where it encounters the resonant cavity and resonates at a frequency. The resonating beam 12 reflects light back into the optical fiber 20 which transmits the modulated light beam to a light sensor. Changes in pressure result in corresponding changes in the resonant frequency of the beam, so that the pressure is sensed. This device is termed a shell coupled pressure sensor.

In the pressure sensor shown in FIG. 2, the light beam from the optical fiber 20 is transmitted through the medium to be sensed, so that the medium under pressure must be transparent for the device to work properly. If the medium is not transparent, some or all of the light leaving the optical fiber 20 is scattered or absorbed before it can bounce off of the beam and re-enter the fiber. This results in degraded performance of the sensor, or even to the point of the sensor being unable to obtain a pressure reading at all.

A further problem is that of packaging the optical fiber 20 with the pressure sensor 10. The packaging must hold the fiber 20 close to the resonant beam 12 to get a good optical coupling; yet the spacing must be sufficient that the medium to be sensed has access to the shell 14 of the pressure sensor 10.

In FIG. 3, the fiber 20 and sensor shell 14 are set at a fixed distance from one another by spacers 22. Openings 24 in the spacers 22 permit the medium to be sensed to access the sensor chamber 26 while maintaining the spacing of the optical fiber 20 from the resonant beam 12. This arrangement addresses the issue of positioning of the fiber and sensor, but presents considerable difficulties in micromachining. Further, the medium to be sensed may become trapped in the sensor space 26 and can foul the optical window at the end of the fiber 20. Any dirt or foreign matter in the medium to be sensed may accumulate on the optical elements of the sensor and fiber and result in deterioration in performance and eventually to complete loss of function.

SUMMARY OF THE INVENTION

The present invention provides a pressure sensor which is resistant to contamination and which operates even in non-transparent media. The present pressure sensor includes a substrate on which is mounted a shell forming vacuum resonant cavity within which is supported a resonant beam. A p-n junction is formed on the top surface of the substrate below the resonant beam. An optical fiber carrying a light beam is in an opening in the underside of the substrate and is positioned to direct the light beam through the substrate toward the resonant beam. A Fabry-Pérot cavity is formed within the shell to impose a frequency on the light beam as it is reflected back into the optical fiber. The sensor is thus able to provide a frequency output that is a direct measure of the pressure applied to the top surface of the shell. A thin film resonant microbeam absolute pressure sensor results.

DETAILED DESCRIPTION OF THE PREFERRED EMBODIMENTS

Figure 1:
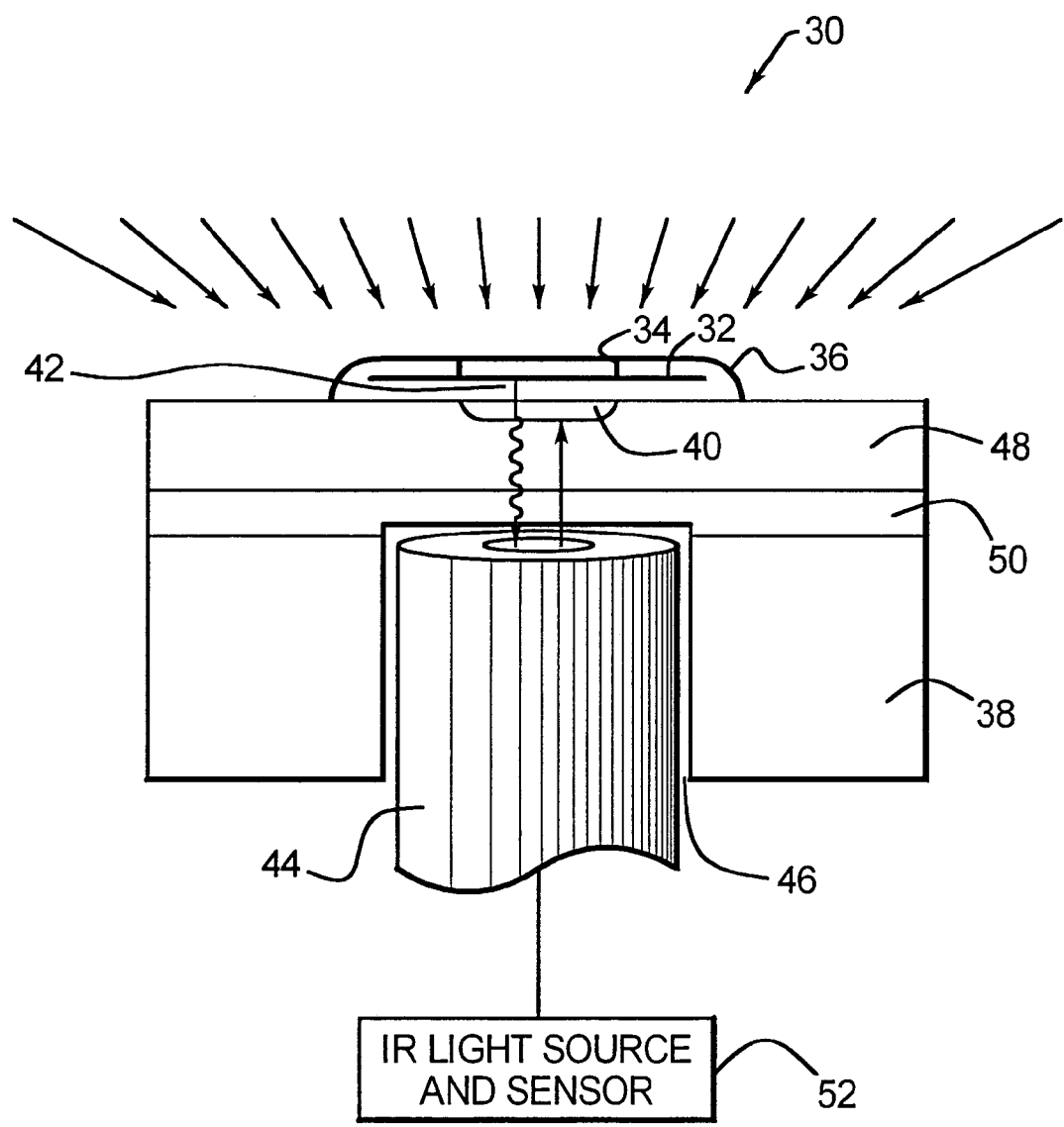
FIG. 1 is a cross sectional view of a pressure sensor according to the principles of the present invention.
Figure 2:
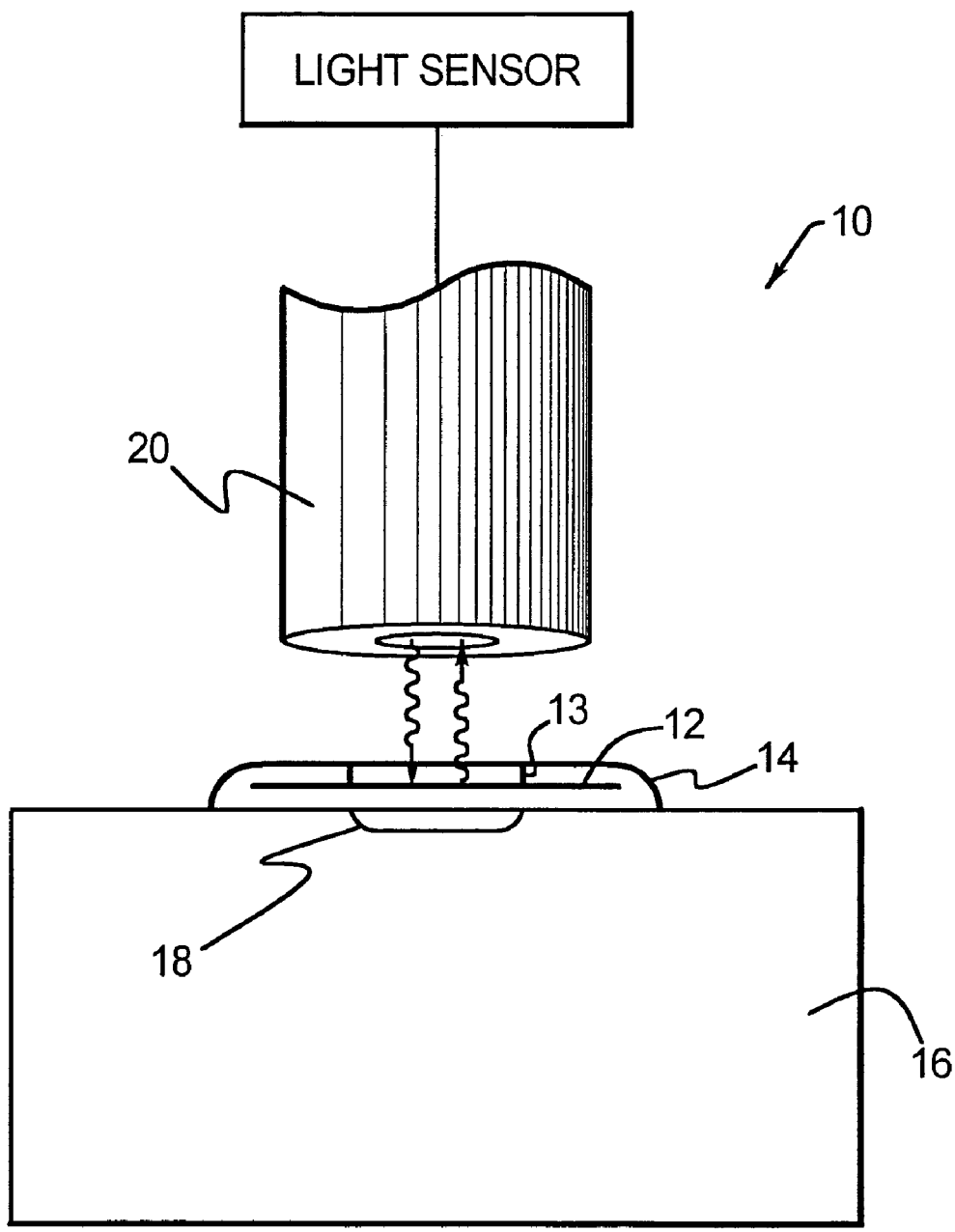
FIG. 2 is a cross sectional view of a pressure sensor of an earlier embodiment.
Figure 3:
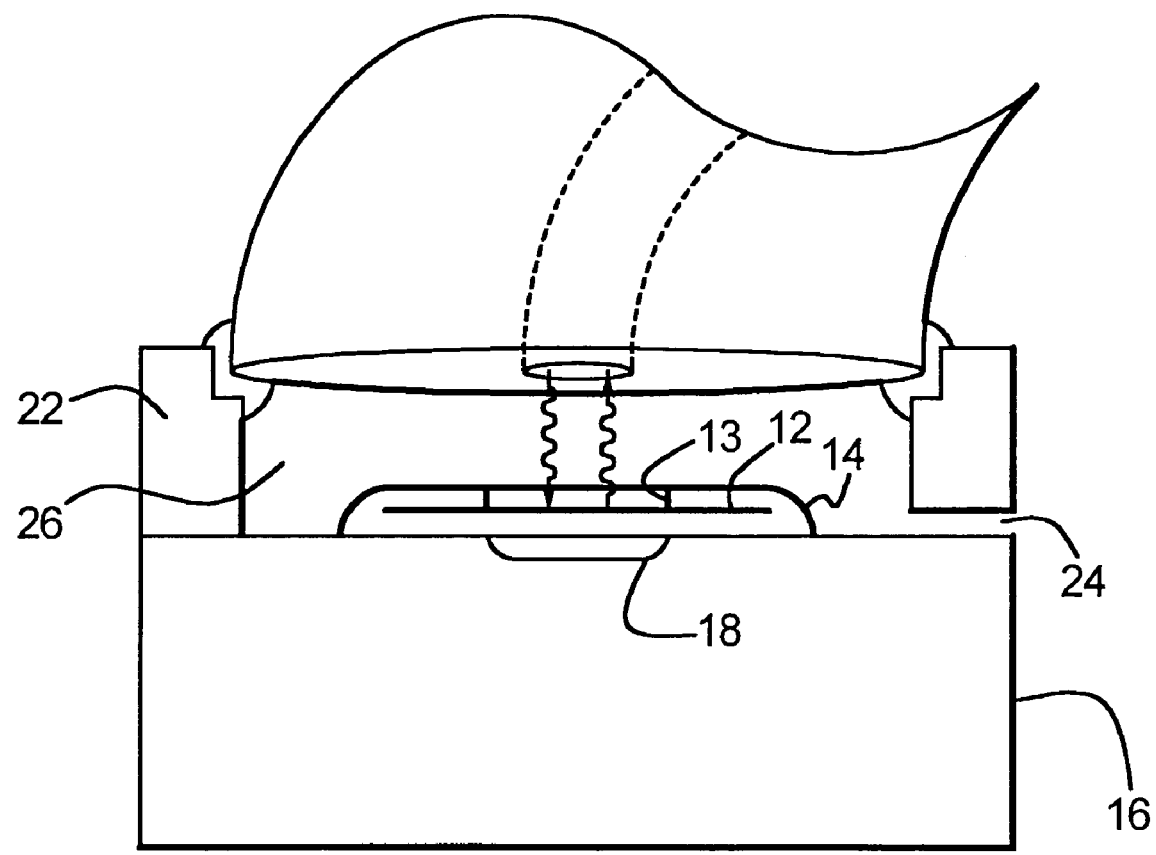
FIG. 3 is a cross sectional view of a pressure sensor of the earlier embodiment showing spacers between the optical fiber and the sensor.

The present invention provides an improvement on the earlier embodiments of the thin film resonant microbeam pressure sensors. In particular, a pressure sensor 30 is provided having a resonant beam 32 held by posts 34 in a shell 36. The shell 36 is mounted on a substrate 38 in the top surface of which is provided a photodiode or p-n junction 40. The interior of the shell 36 is evacuated to provide at least a partial vacuum. A Fabry-Pérot optical resonant cavity 42 is formed in the shell 36 including a first portion between the beam 32 and the inside top surface of the shell 36 and a second portion between the underside of the beam 32 and the top surface of the substrate 38. The beam 32 may be partially transparent to permit light to move between the two portions of the optical cavity, or they may be opaque in which case only the lower Fabry-Pérot cavity is optically active. The shell 36 and beam 32 are preferably of polysilicon and constitute a microstructure.

An optical fiber 44 is provided in an opening 46 in the underside of the substrate 38. The optical fiber 44 is mounted to direct the light beam from the fiber 44 toward the resonant beam 32. The opening 46 in the underside of the substrate 38 permits the fiber 44 to be positioned close enough to the beam 32 to permit the sensing of the light reflected by the beam 32.

To form the opening 46 in the substrate 38, a silicon on insulator (SOI) wafer is provided having a layer of silicon 48 of about 10 microns formed over a layer of silicon dioxide ($SiO_2$) 50 of about 1 micron in thickness. The silicon substrate 38 is generally several hundred microns thick. The opening 46 is formed by first photo-patterning a circular hole on the back side of the substrate wafer 38 and then etching the substrate material. The circular hole is preferably slightly larger than the diameter of the optical fiber 44. The etching process stops at or in the silicon dioxide layer 50, leaving the thin silicon layer 48 at the top surface of the substrate 38 at the hole. The selectivity of the etchant for silicon to silicon dioxide is about 300:1, so the etch process is relatively easy to stop at the silicon dioxide layer.

The etching step may be performed before the formation of the sensor structure on the substrate, during the formation of the sensor structure on the substrate, or after the formation of the sensor structure on the substrate.

A hole 46 is etched all the way up to the silicon dioxide layer 50 and the optical fiber 44 is positioned in the hole. Since the silicon layer 48 and the silicon dioxide layer 50 are both transparent to infrared light, an infra-red light source 52 is used so that the light from the fiber passes through the silicon 48 and silicon dioxide 50 layers and reaches the photodiode 40 and the beam 32 and shell structure 36.

In operation, the infra-red light from the optical fiber 44 travels through the silicon dioxide and silicon layers 50 and 48 and into the cavity 42 within the shell 36. The light is partially reflected by the surfaces of the beam 32, the surface of shell 36 and the surface of the photodiode or p-n junction 40. The optical cavity 42 provides multiple optical paths involving the top of the photodiode 40, the resonator beam 32 and the inside surface of the shell 36. The various optical paths operate as a set of Fabry-Pérot cavities. The various beams of light that travel along the various optical paths will either constructively interfere with one another or destructively interfere with one another when they arrive at the photodiode 40. The intensity of light arriving at the photodiode therefore changes as the spacing between the resonator elements changes.

Light energy striking the p-n junction 40 at the surface of the substrate 38 results in a charge accumulation in the p-n junction 40. The charge accumulation draws the resonator beam 32 toward the p-n junction 40 through electrostatic attraction. If the light energy striking the p-n junction 40 is reduced, the beam relaxes back away from the junction. If the light energy striking the p-n junction 40 is increased again, the beam is attracted to the junction again. The movement of the beam 32 continues in a cyclic manner to create a physical resonating movement, or vibration, of the beam. The light energy striking the p-n junction may be increased and decreased either by modulating the light energy at its source (e.g. modulating the intensity of the laser), or by making the structure self-resonant as taught in U.S. Pat. No. 5,559,358.

The physically resonating beam 32 in the optical Fabry-Pérot cavities modulates the light that is reflected back into the optical fiber with changing frequencies. The modulated light is sensed by the sensor 52 to define a pressure state of the pressure sensor. When the sensor element 30 is subjected to pressure changes, the tension on the beam changes which changes the frequency of vibration of the beam and a corresponding change in the modulation of the light returned into the fiber 44. Therefore, pressure changes are sensed in the present pressure sensor 30.

It is noted that no electrical connections are present to the photodiode or p-n junction 40. The junction is present to accumulate charges.

The present invention effectively senses pressure even though the light of the optical fiber 44 passes through the p-n junction 40 and the substrate 38. In particular, with the present invention it is still possible to sense the modulation of the light and the variations therein even though the p-n junction 40 is directly illuminated by the light of the optical fiber 44 passing therethrough. This is because the light that passes through the Fabry-Pérot cavity after illuminating the photodiode interferes with the light that directly illuminates the photodiode.

By positioning the optical fiber 44 in the hole 46, it is possible to locate the fiber 44 about 10 microns from the resonant beam 32, resulting in a good optical coupling between the beam 32 and the fiber 44.

The present invention permits the sensing of pressure using a resonant beam sensor without regard to the optical properties of the medium to be sensed. The medium may be dirty or even opaque. Furthermore, the medium does not result in contamination of the optical surfaces.

The present invention permits the use of a simple process for sensor manufacture. No spacers are required to define the beam/fiber spacing and no pressure access channels need to be formed. Further, no spaces to trap dirt or fluids are present.

Manufacturing costs are low and simple to carry out. The sensor element 30 is simply bonded directly onto the optical fiber 44.

The die for the sensor 30 may be very small, and as such is cheap to make. The hole 46 for the fiber may be made by deep reactive ion etching which is only a few hundred microns wide.

The present sensor may be made extremely small and may have a diameter only slightly larger than the tip of an optical fiber.

Although the present application calls for a beam as the resonating member, it is also envisioned that the resonating member may be of a variety of shapes, including a disk, for example.

Thus, there is shown and described a pressure sensor utilizing an optical beam to sense changes in resonant frequencies of optical resonators which modulate the light by physical resonance.

Although other modifications and changes may be suggested by those skilled in the art, it is the intention of the inventors to embody within the patent warranted hereon all changes and modifications as reasonably and properly come within the scope of their contribution to the art.

We claim:

1. A pressure sensor, comprising:
  an optical fiber emitting a light beam;
  a beam to respond to changes in pressure;
  a substrate having a first surface on which said beam is mounted and having a second surface opposite said first surface, said substrate defining an opening which is open from said second surface of said substrate, said optical fiber being mounted in said opening in said substrate to direct said light beam onto said beam; and a junction in said substrate to receive a portion of said light beam which impinges on said beam to drive said beam into vibration.

2. A pressure sensor as claimed in claim 1, further comprising:
a shell on said first surface of said substrate enclosing said beam, said shell having an evacuated interior space.

3. A pressure sensor as claimed in claim 1, wherein said optical fiber is positioned to direct said light beam through said junction prior to impinging said beam.

4. A pressure sensor as claimed in claim 1, wherein said substrate includes a layer of semiconductor on said first surface and a layer of insulator below said layer of semiconductor.

5. A pressure sensor as claimed in claim 1, wherein said beam of light is infra-red light.

6. A pressure sensor as claimed in claim 1, wherein the junction comprises a p-n junction.

7. A pressure sensor comprising:
a semiconductor substrate having a surface;
a beam supported above the surface of the substrate;
a junction formed in the surface of the substrate; and,
an optical fiber positioned so as to direct light through the substrate to the junction and to the beam so that the light directed through the substrate causes the junction to excite vibration of the beam and so that the light is modulated by the vibrating beam.

8. The pressure sensor of claim 7 further comprising:
a shell on the surface of the substrate enclosing the beam, the shell having an evacuated interior space.

9. The pressure sensor of claim 7 further comprising a layer of an insulator below the semiconductor substrate.

10. The pressure sensor of claim 7 wherein the light is infra-red light.

11. The pressure sensor of claim 7 wherein the junction comprises a p-n junction.

12. The pressure sensor of claim 7 further comprising a sensor that senses the modulated light to detect pressure acting on the beam.

13. A pressure sensor comprising:
an SOI wafer comprising top and bottom semiconductor layers separated by an insulation layer, wherein the top semiconductor layer has an outwardly facing surface;
a beam supported above the surface of the top semiconductor layer;
a junction formed in the surface of the top semiconductor layer; and,
an optical fiber positioned so as to direct light through the SOI wafer to the junction and to the beam so that the light directed through the SOI wafer causes the junction to excite vibration of the beam and so that the light is modulated by the vibrating beam.

14. The pressure sensor of claim 13 further comprising:
a shell on the surface of the top semiconductor layer enclosing the beam, the shell having an evacuated interior space.

15. The pressure sensor of claim 13 wherein the light is infra-red light.

16. The pressure sensor of claim 13 wherein the junction comprises a p-n junction.

17. The pressure sensor of claim 13 wherein the bottom semiconductor layer has a hole therein, and wherein the optical fiber inserted into the hole and is arranged to direct light to the junction and to the beam.

18. The pressure sensor of claim 13 further comprising a sensor that senses the modulated light to detect pressure acting on the beam.

* * * * *